March 25, 1969  M. P. YOKE ET AL  3,434,744
TUBE FITTING WITH LOCKING MEANS
Filed July 19, 1966
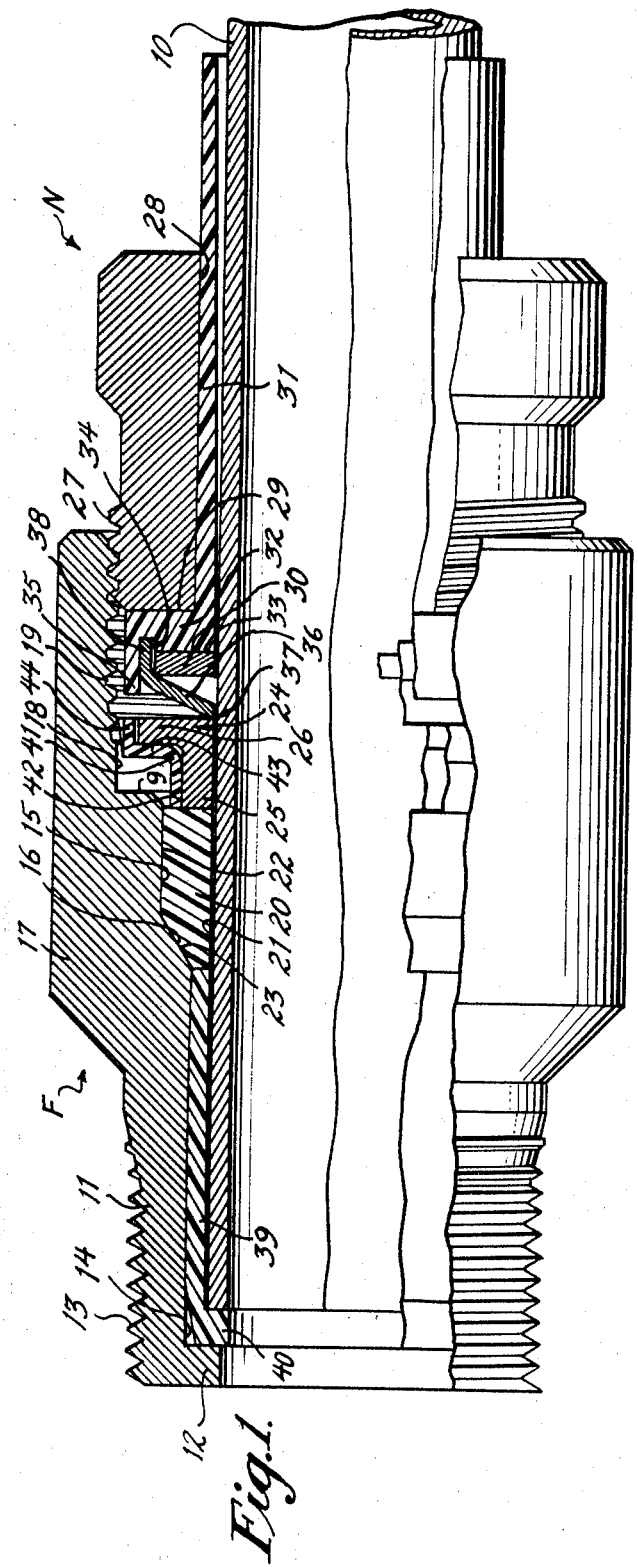
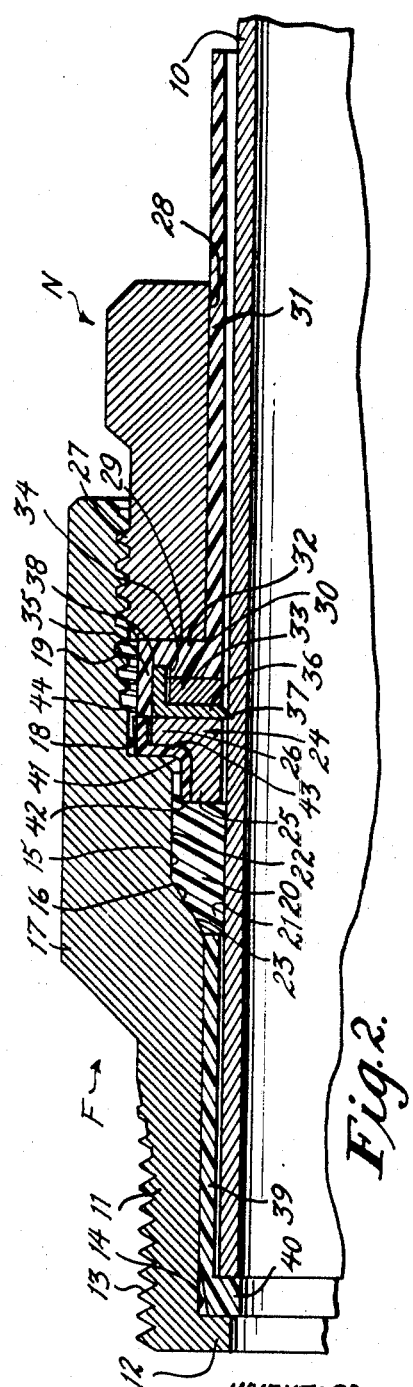
INVENTORS.
MICHAEL P. YOKE
ROBERT P. MONTESI
ROBERT N. PATERSON
BY
ATTORNEY.

United States Patent Office 3,434,744
Patented Mar. 25, 1969

3,434,744
TUBE FITTING WITH LOCKING MEANS
Michael P. Yoke, Robert P. Montesi, and Robert N. Paterson, Bradford, Pa., assignors to Dresser Industries, Inc., Dallas, Tex., a corporation of Delaware
Filed July 19, 1966, Ser. No. 566,408
Int. Cl. F16l 35/00
U.S. Cl. 285—52                                9 Claims

ABSTRACT OF THE DISCLOSURE

A compression type tube coupler for thin wall piping. The coupler includes an internally threaded body in which to receive a screwed follower. Acted upon independently of each other within the body by advancement of the follower is a separated gasket and conduit lock member.

---

This invention relates to the art of tube fittings, and more particularly resides in a compression type fitting incorporating locking means to prevent separation under pressure.

A fitting of the type presently considered is adapted to be slipped onto an end of thin-walled fluid-conducting tubing and to connect it to other components of a fluid system. Prior art fittings have included a gasket which is placed under pressure to effect sealing against the tubing, in combination with an annular locking element which is forced to bite into the tubing to prohibit its withdrawal from the fitting under fluid pressure or other influences. For some applications it is desirable that such a fitting also be designed to provide electrical insulation between the fitting and tubing. One common characteristic of some prior art fittings is that the assembled locking element and elastomeric gasket means have been very intimately associated with each other physically as well as being functionally interdependent. If, therefore, the sealing action failed, the locking action also would fail, and vice versa. A further consequence directly attributable to this close association involves the compressive action of the gasket on a soft metal tubing wall. If excessive tightening pressure is generated by tightening of the follower nut, the gasket will deform the tubing wall within the zone of the locking element, thereby impairing its effective biting action on the tubing wall.

An object of this invention is to provide a fitting employing a compression type sealing gasket and a locking element which are functionally independent, i.e., the failure of one will not affect or be caused by the failure of the other.

A further object is to provide a fitting wherein the possible degree of collapse of the tubing by the gasket is limited, and wherein such collapse cannot impair the biting action of the locking element.

Another object is to provide a fitting attaining the above objects and further serving to electrically insulate the tubing from the fitting.

A still further object is to provide a fitting wherein the application of bending forces to the length of tubing outside the fitting will not deform the tubing at the zone of the locking element.

In accordance with this invention, a sealing gasket and locking element are assembled in an arrangement wherein they are physically separated and functionally independent. In this fitting the body has a smaller inward counterbore and an internally threaded larger outer counterbore or socket, with the gasket being contained within the smaller counterbore. An L-shaped thrust ring has an axially extending flange which moves against the gasket within the smaller counterbore upon tightening of the follower nut, and a radial flange which engages a shoulder provided by the end of the larger socket when the desired limit of inward movement of the thrust ring has been reached. By this means the amount of compressive force that can be applied to the gasket is limited, thereby insuring against excessive collapse of the soft tubing wall. A conical metal locking ring is received by an assembly between the other side of the thrust ring and the externally threaded follower nut, being thereby physically separated from the gasket by the axial length of this thrust ring. Upon tightening of the follower nut the locking element is flattened between the thrust ring and a washer, causing its inwardly directed edge to bite into the tubing and lock it against withdrawal from the tubing. By virtue of this arrangement, the gasket and the locking element are not affected by each other functionally, and it has a built-in assurance, when the follower nut is tightened to the limit of its travel, that both of them have been properly deformed to achieve optimum performance. An added feature is that the follower nut has a large axial dimension, whereby external bending of the tubing will not tend to deform it at the location of the locking element.

In the fitting according to this invention, electrical insulation is provided by three insulating elements. A first sleeve abuts the farthest inner end of the gasket and insulates the tube end from the fitting body; a second sleeve is received within the follower nut bore and has a radial flange provided with a groove to receive the locking element; and a third insulating element has a shape conforming to that of the thrust ring and insulates it from the fitting body.

Further objects, advantages and details of this invention will become apparent from the following description when read with reference to the accompanying drawings, in which:

FIGURE 1 is an axial section through a fitting according to this invention and an inserted tube prior to tightening of the follower; and FIGURE 2 is the same axial section illustrating the relative position of the parts after tightening of the follower nut.

Referring now to the drawings, a tube is indicated at 10, and as mentioned above this tube 10 will ordinarily be of relatively soft metal such as copper. Copper tubing of this type is ordinarily of small diameter and the present invention will be described in conjunction with such tubing having an outside diameter ranging from three-eighths inch to one inch.

The body of the fitting is generally referred to in its entirety by the reference character F. Body F has a cylindrical end portion 11 which terminates in an inwardly extending end flange 12 and has external threads 13 to provide for connection of the fitting to other parts of a hydraulic or pneumatic system, for example. Extending inwardly from the flange 12 is a bore 14 merging with an enlarged counterbore 15 at a conical section 16, the body wall in the area of counterbore 15 and conical section 16 being thicker as indicated at 17. The thicker wall 17 defines a socket 18 which is of larger inside diameter than the counterbore 15 and is internally threaded as indicated at 19. The inner end 9 of the socket 18 constitutes a shoulder, for purposes mentioned hereafter. A gasket 20 has a bore 21 which receives the tubing 10, an outer cylindrical surface 22 which engages the counterbore 15, and a conical surface 23 in engagement with the conical section 16. This gasket comprises rubber or a comparable elastomer material of the type commonly employed for gaskets in compression fittings and couplings.

A metal thrust ring is indicated at 24, and has a generally L-shaped cross section presenting an axial flange 25 and a radical flange 26. It is significant that the axial length of the thrust ring 24 as determined by the flange 25, should be at least one-eighth inch.

A follower nut is designated N and is externally threaded as indicated at 27 whereby it is screwed into the fitting body F. The nut has a bore 28 and an inner end face 29, and preferably has an axial length of at least three-fourths of an inch.

When the fitting is of the insulating type a sleeve 31 is positioned in the bore 28 to insulate the follower nut N from the tube 10. This insulating sleeve 31 has an end flange 32 which is interposed between the end face 29 of the nut and a backup ring 30. The inner end face of this flange 32 is represented at 33 and has a radial extent comparable to that of the backup ring 30. Radially outside of the backup ring 30 the end flange 32 is formed with a recess 34, and an annular skirt 35 defining the outer wall of the recess 34 and extends axially beyond the backup ring 30 in spaced relation thereto.

A locking element in the form of a ring 36 is conical in shape in its natural condition. This ring 36 has a sharp inner edge 37 which is adapted to bite into the tube 10, and integrally formed at its outer edge is an extension 38 which extends over backup ring 30 and projects into the recess 34, with the skirt 35 enclosing the outer side thereof.

In the insulating type of fitting another sleeve 39 is positioned in the bore 14 to insulate the fitting body F from the tubing 10. The insulating sleeve 39 has an end flange 40 interposed between the body and flange 12 and the end of the tube. Insulation for thrust ring 24 is provided in the form of a member 41. This insulating member 41 has an annular portion 42 which covers the annular portion 25 of the ring 24, a radial portion 43 covering its radial flange 26, and an annular end flange 44 interposed between the outer edge of the radial flange 26 and the socket 18.

In operation, when the fitting is initially applied to the tube 10, the thrust ring 24 and backup ring 30 are spaced apart as illustrated in FIGURE 1 and the lock ring 36 is of conical shape. As the nut N is turned it enters the socket 18 to advance the backup ring 30 toward the thrust ring 26. As these two members are drawn closer the lock ring 36 is flattened, thereby causing its sharp edge 37 to dig into the tube 10 in a locked condition as shown in FIGURE 2.

It is evident that compressive forces are generated which might cause the gasket 20 to crush the tube 10. However, due to the axial length of the thrust ring 24 as determined by the flange 25 the zone deformation of the tube is removed from the ring 36 and this eliminates any possibility the locking action might be impaired. Moreover, should any bending forces be applied to the tube 10 externally of the nut N, the length thereof insures that bending or deformation will not take place at the zone of the locking ring.

As the follower nut N enters the socket 18 of the follower nut F the thrust ring 24, backup ring 30, and lock ring 36 initially move as a unit. The axial flange 25 of the thrust ring engages the free end of the gasket 20 and causes deformation and compression of the gasket 20 about the tube 10. This action can continue only until the flange 43 of the insulating member 41 engages the shoulder 9. Thus, the extent to which the gasket 20 may be deformed is limited.

When further inward movement of the thrust ring 24 is prevented by the shoulder 9, assurance is had that continued tightening of the follower N will move the backup ring 30 toward the thrust ring 24 and thereby straighten the lock ring 36 and achieve the lock. Thus the seal provided by the gasket 20 and the lock provided by the lock ring 36, are independent of one another.

While a preferred specific embodiment of the invention is hereinbefore set forth, it is to be clearly understood that the invention is not to be limtied to the exact constructions, mechanisms, and devices illustrated and described because various modifications of these details may be provided in putting the invention into practice.

What is claimed is:

1. A fitting comprising a body having a central cylindrical bore adapted to receive the end of a tubular conduit and a larger counterbore extending inwardly from one end of the body to define a space for an annular gasket, an annular elastomeric gasket within said space, a follower member having a circular portion extending within said body from said one end and having a threaded connection to the body whereby it can be advanced inwardly, a thrust ring engaging said gasket to apply compressive force thereto, an axially deformable lock ring between said thrust ring and follower member having a radially inwardly directed edge which bites into a received conduit when axially deformed in response to inward advance of said follower member, said lock ring being separated from said gasket by said thrust ring and having a generally greater resistance to deformation than said gasket whereby to deform substantially in sequence after predetermined compression of said gasket, and means cooperating independent of said gasket positively limiting the extent of inward axial advancement of said thrust ring after achieving said predetermined compression of said gasket.

2. A fitting according to claim 1, wherein said body has a first counterbore providing space for said gasket and a larger second counterbore leading outwardly toward said follower, said first and second counterbores being joined by a shoulder, said thrust ring having an axial flange portion engaging the gasket and a radial portion which is effectively stopped by said shoulder.

3. A fitting according to claim 1, including an insulating sleeve covering said thrust ring and electrically insulating the same from said body.

4. A fitting according to claim 1, wherein said follower includes an electrically insulating sleeve having an axial portion extending within the bore of the follower and insulating the same from the conduit tubing, and a radial portion housing the outer edge of said lock ring.

5. A fitting according to claim 4, including a metal ring between said sleeve and lock ring.

6. A fitting comprising an internally threaded body having a central cylindrical bore adapted to receive the end of a tubular conduit and a pair of counterbores of different diameters extending inwardly from one end of the body, the inner counterbore being smaller in diameter than the outer counterbore and defining space for an annular gasket, the larger outer counterbore and said inner counterbore being joined by an axially facing shoulder, an elastomeric gasket in said inner counterbore, a thrust ring having a relatively long axially directed flange serving to compress the gasket within said inner counterbore and a radially directed flange received by the space within said larger outer counterbore, said shoulder acting to effectively encounter said radially directed flange and stop inward advancement of said thrust ring against the gasket after the gasket has been compressed a predetermined amount, an externally threaded follower screwed into the threads of said body, and a locking ring disposed axially between said follower and said thrust ring having an inwardly directed edge adapted to grip a tubular conduit when contained thereat, said follower operable engaging said locking ring upon being threaded into said body thereby axially urging said locking ring effectively against said thrust ring, whereby when said thrust ring effectively engages said shoulder said locking ring is forced to grip said tube by further axially inward movement of said follower.

7. A fitting according to claim 6, wherein said locking ring is substantially cup shaped, and said follower engages an insulating sleeve shaped to receive the axially directed rim portion thereof.

8. A fitting according to claim 6, including a metal washer between the radially directed portion of said locking ring and the follower.

9. A fitting comprising a body having a central cylindrical bore adapted to receive the end of a tubular conduit and a larger counterbore extending inwardly from one end of the body to define a space for an annular gasket, an annular elastomeric gasket within said space, a follower member having a threaded connection to the body whereby it can be advanced directionally inward thereof, a thrust ring engaging said gasket to apply compressive force thereto, an axially deformable lock ring between said thrust ring and follower member having a radially inwardly directed edge which bites into a received conduit when axially deformed in response to inwardly advance of said follower member, said lock ring being separated from said gasket by said thrust ring and having a generally greater resistance to deformation than said gasket whereby to deform substantially in sequence after predetermined compression of said gasket, and means cooperating independent of said gasket positively limiting the extent of inward axial advancement of said thrust ring after achieving said predetermined compression of said gasket.

References Cited

UNITED STATES PATENTS

| | | | |
|---|---|---|---|
| 2,278,479 | 4/1942 | Parker | 285—54 |
| 2,909,376 | 10/1959 | Drew | 285—342 X |
| 2,999,701 | 9/1961 | Blair et al. | 285—340 |
| 3,140,107 | 7/1964 | Hynes | 285—340 |
| 3,186,740 | 6/1965 | Lee | 285—357 X |
| 3,312,484 | 4/1967 | Davenport | 285—340 |
| 2,499,024 | 2/1950 | Hollyday | 285—348 |

FOREIGN PATENTS 880,495  10/1961  Great Britain.

THOMAS F. CALLAGHAN, *Primary Examiner.*

U.S. Cl. X.R.

285—54, 340, 348, 356